United States Patent
Murata (10) Patent No.: US 10,151,372 B2
(45) Date of Patent: Dec. 11, 2018

(54) TORQUE TRANSMISSION APPARATUS

(71) Applicant: Honda Motor Co., Ltd., Tokyo (JP)

(72) Inventor: Toshiki Murata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 15/379,366

(22) Filed: Dec. 14, 2016

(65) Prior Publication Data
US 2017/0184178 A1    Jun. 29, 2017

(30) Foreign Application Priority Data

Dec. 24, 2015  (JP) ................................ 2015-252260

(51) Int. Cl.
*F16F 15/121*    (2006.01)
*F16F 15/123*    (2006.01)

(52) U.S. Cl.
CPC .... *F16F 15/1232* (2013.01); *F16F 15/12346* (2013.01)

(58) Field of Classification Search
CPC .......................... F16F 15/1232; F16F 15/12346
USPC ............... 464/68.9, 68.92; 192/205; 267/180
See application file for complete search history.

(56) References Cited

U.S. PATENT DOCUMENTS

| | | | | |
|---|---|---|---|---|
| 4,810,231 A | * | 3/1989 | Weissenberger | F16F 1/043 267/180 |
| 5,377,560 A | * | 1/1995 | Schierling | F16F 15/13438 464/68.92 |

FOREIGN PATENT DOCUMENTS

| | | |
|---|---|---|
| JP | 1985081520 | 9/1985 |
| JP | 1988103033 U1 | 7/1988 |
| JP | 2014111959 A | 6/2014 |
| JP | 2015086965 A | 5/2015 |

OTHER PUBLICATIONS

Japanese Office Action; Application No. 2015-252260; dated Sep. 13.

* cited by examiner

*Primary Examiner* — Greg Binda
(74) *Attorney, Agent, or Firm* — Duft & Bornsen, PC (57) ABSTRACT

A torque transmission apparatus including a first rotor, a second rotor, an elastic body deployed in a torque transmission path between the first rotor and the second rotor to absorb torque fluctuation between the first and second rotors, and a pair of seat members. The pair of seat members include holding portions for holding ends of the elastic body at one end surfaces and contact surfaces at the other end surfaces, and the contact surfaces are formed into convex curved surfaces so as to rollably contact concave curved lateral end surfaces of a housing of the first rotor and concave curved lateral end surfaces of projecting portions of the second rotor.

8 Claims, 6 Drawing Sheets

REARWARD ←——→ FORWARD

TORQUE TRANSMISSION APPARATUS

CROSS-REFERENCE TO RELATED APPLICATION

This application is based upon and claims the benefit of priority from Japanese Patent Application No. 2015-252260 filed on Dec. 24, 2015, the content of which is incorporated herein by reference.

BACKGROUND OF THE INVENTION

Field of the Invention

This invention relates to a torque transmission apparatus having a function of absorbing torque fluctuation.

Description of the Related Art

Apparatuses are known that comprise a first rotor connected to a power source and a second rotor connected to the first rotor through an elastic body, wherein torque of the first rotor is transmitted to the second rotor through the elastic body and the elastic body absorbs torque fluctuation.

In an apparatus described in Japanese Laid-open Patent Publication No. 2015-86965 (JP2015-086965A), for example, the first rotor is connected to an engine and the second rotor is connected to a transmission through a clutch. Multiple springs are circumferentially disposed in housings formed inside the first rotor, seat members (spring seats) are deployed at opposite ends of every spring, and a part of the second rotor are further disposed between adjacent seat members. Therefore, torque of the first rotor is transmitted to the second rotor through the springs and seat members.

However, in the apparatus described in JP2015-086965A, since the seat members are deployed facing an outer circumferential surface of the housing, when large centrifugal force acts on the seat members, the seat members are apt to stick on the outer circumferential surface of the housing of the first rotor. As a result, the spring cannot provide appropriate elastic force between the first and second rotors, and thus vibration absorption performance of the apparatus declines.

SUMMARY OF THE INVENTION

According to an aspect of the present invention, a torque transmission apparatus includes: a first rotor rotatable around a axial line; a second rotor rotatable relative to the first rotor around the axial line, facing the first rotor; an elastic body provided in a torque transmission path between the first rotor and the second rotor to transmit torque from one of the first rotor and the second rotor to the other of the first rotor and the second rotor and to absorb torque fluctuation between the first rotor and the second rotor; and seat members including holding portions configured to hold ends of the spring; wherein the first rotor includes a housing configured to accommodate the seat members in a circumferentially movable manner, the housing including an outer circumferential surface and lateral end surfaces, the lateral end surfaces being formed into concave curved surfaces so as to restrict the seat members from moving radially and circumferentially, the second rotor includes projecting portions formed so as to radially project, each of the projecting portions including lateral end surfaces, the lateral end surfaces being formed into concave curved surfaces so as to restrict the seat members from moving radially and circumferentially, the seat members include a pair of seat members deployed at opposite circumferential ends of the housing, each of the pair of seat members being interposed between the elastic body and both a lateral end surface of the lateral end surfaces of the housing and a lateral end surface of the lateral end surfaces of the projecting portion in the torque transmission path so as to be contactable with and separable from the lateral end surface of the housing and the lateral end surface of the projecting portion, and each of the pair of seat members includes the holding portion at one circumferential end surface thereof and a contact surface at the other circumferential end surface thereof, the contact surface being formed into a convex curved surface so as to rollably contact the lateral end surface of the housing and the lateral end surface of the projecting portion.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
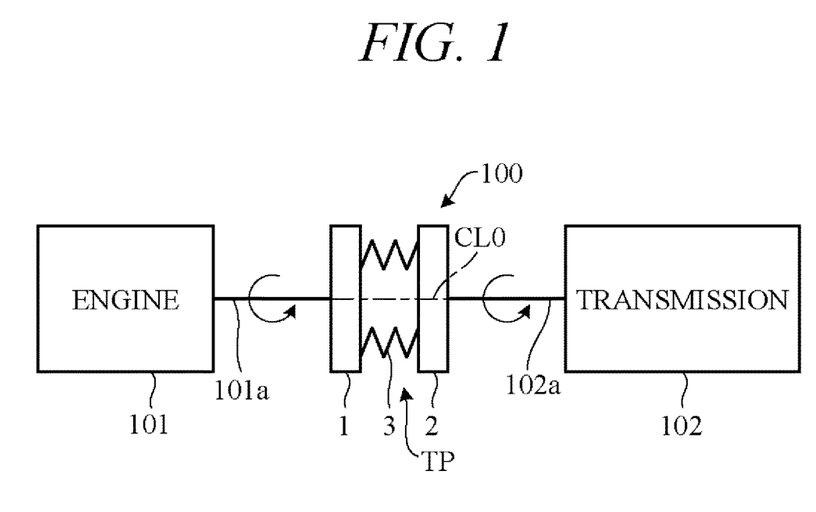
FIG. 1 is a diagram schematically illustrating an application example of a torque transmission apparatus according to an embodiment of the present invention.

An embodiment of the present invention is explained in the following with reference to FIGS. 1 to 6. FIG. 1 is a diagram schematically illustrating an application example of a torque transmission apparatus 100 according to an embodiment of the present invention. The torque transmission apparatus 100 is interposed in a power transmission path between an engine 101 and a transmission 102 mounted on a vehicle via or not via a clutch (not shown).

The torque transmission apparatus 100 has a first rotor 1 and second rotor 2 both installed to be rotatable around an axially extending center line (axial line) CL0, and springs 3 installed in a torque transmission path TP between the first rotor 1 and the second rotor 2. The first rotor 1 is connected to an output shaft (crankshaft) 101a of the engine 101, and the second rotor 2 is connected to an input shaft 102a of the transmission 102. Torque input to the first rotor 1 from the engine 101 is transmitted to the second rotor 2 through the springs 3. At this time, torque fluctuation between the first rotor 1 and the second rotor 2 is absorbed by expansion or contraction of the springs 3. As a result, transmission to the transmission 102 of vibration owing to rotational fluctuation of the engine 101 can be damped.

Figure 2:
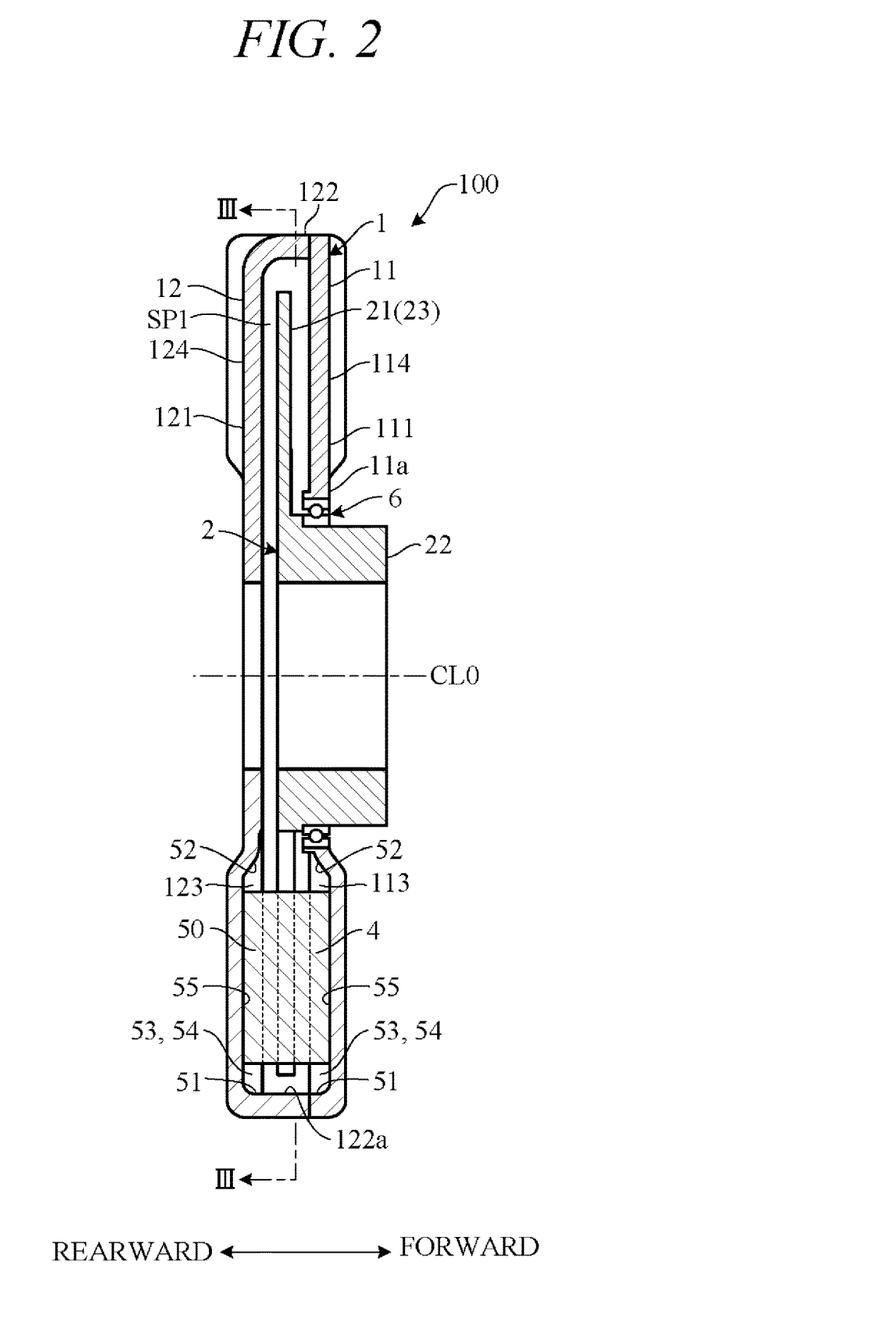
FIG. 2 is a cross-sectional diagram illustrating a main part configuration of the torque transmission apparatus according to the embodiment of the present invention.
Figure 3:
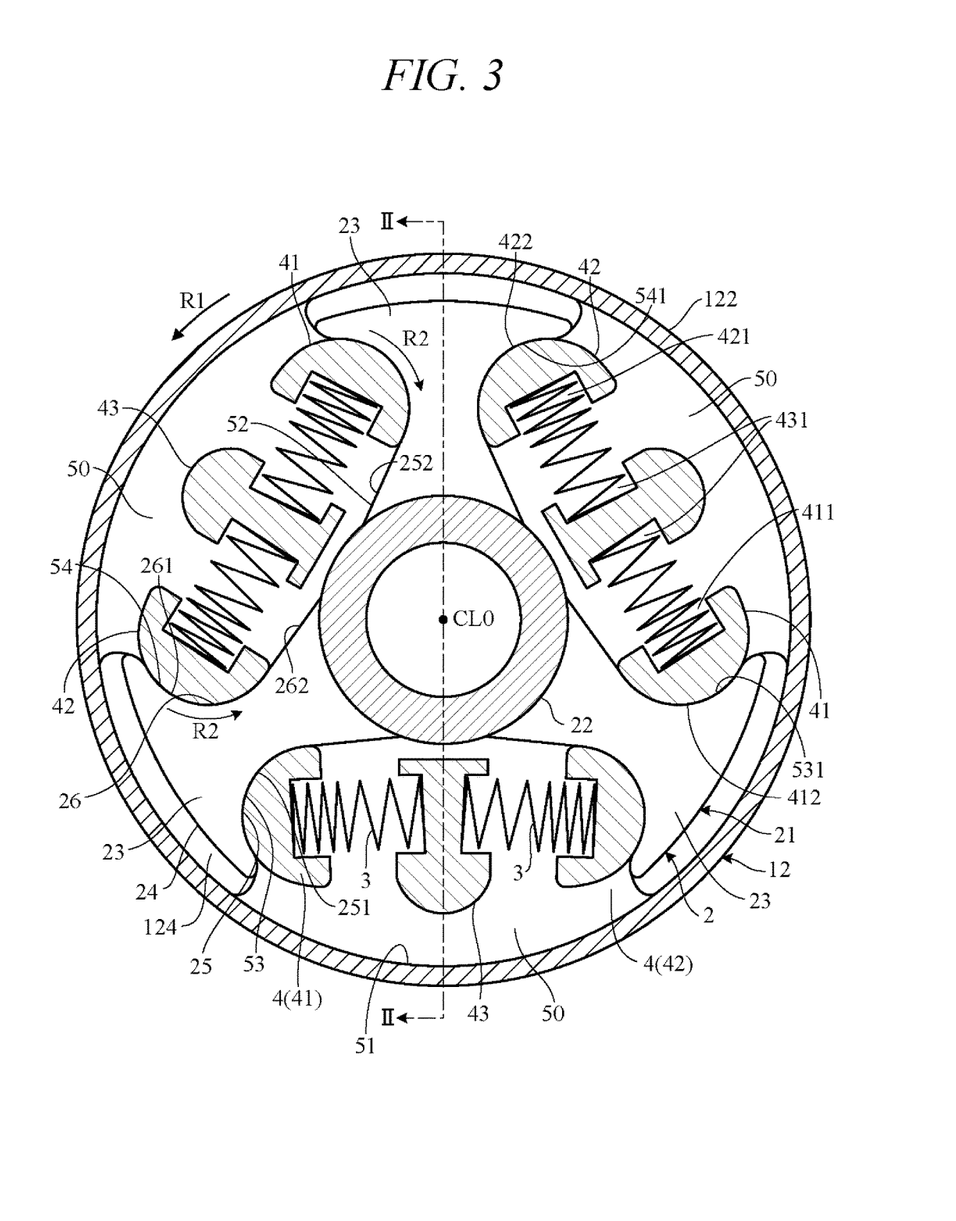
FIG. 3 is a cross-sectional diagram taken along line of FIG. 2.

FIG. 2 is a cross-sectional diagram (cross-sectional diagram taken along axial line CL0) illustrating a main part configuration of the torque transmission apparatus according to the embodiment of the present invention, and FIG. 3 is a cross-sectional diagram taken along line of FIG. 2 (diagram of cross-section taken orthogonal to axial line CL0). As viewed in FIG. 3, FIG. 2 corresponds to a sectional configuration taken along line II-II in the drawing. For convenience of explanation, a direction along the axial line CL0 as shown in FIG. 2 is defined as a forward-rearward direction, a direction radiating from the axial line CL0 is defined as a radial direction, and a direction along a circle centered on the axial line CL0 is defined as a circumferential direction. The structural components are explained in line with these definitions in the following.

As shown in FIG. 2, the first rotor 1 integrally includes a front plate 11 and a rear plate 12, both of ring-like shape centered on the axial line CL0. Although not illustrated, the first rotor (for example, the front face of the front plate 11) is provided with a torque input portion to which torque from the engine 101 is input.

The rear plate 12 includes a radially extending side plate part 121 and a circular annular part 122 bent forward from an outer radial edge of the side plate part 121 to extend axially. The front plate 11 includes a radially extending side plate part 111. A front edge region of the circular annular part 122 of the rear plate 12 is joined to the outer radial edge of the front plate 11 by welding or fastened thereto by bolts. At this time, a ring-like space SP1 whose outer circumferential side is covered by the circular annular part 122 is formed between the side plate part 111 of the front plate 11 and the side plate part 121 of the rear plate 12.

Figure 4:
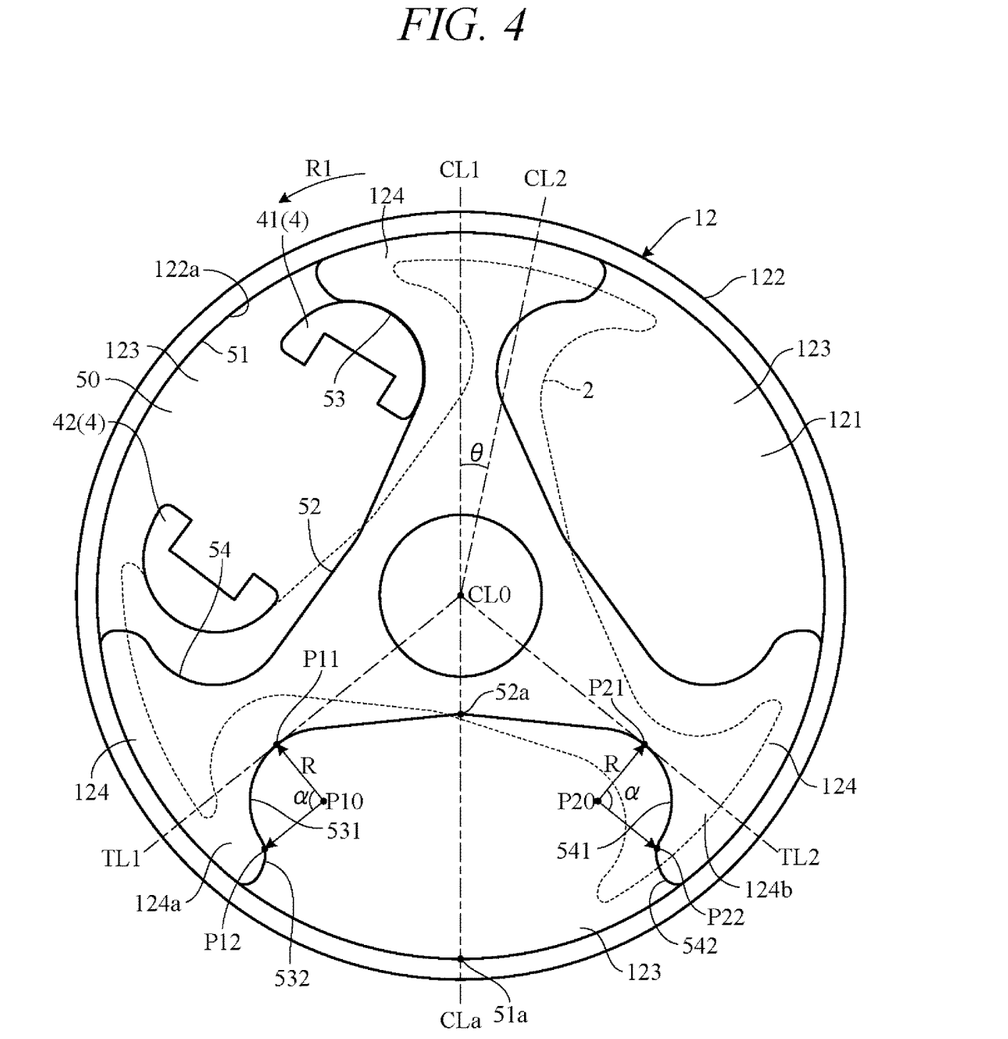
FIG. 4 is a plan diagram of the rear plate of the first rotor constituting the torque transmission apparatus of FIG. 2.

FIG. 4 is a plan diagram of the rear plate 12 (viewed from front). Some of the seat members 4 discussed later are included in FIG. 4. In addition, part of the second rotor 2, discussed later, is indicated by a dotted line. As shown in FIG. 4, identically shaped depressions 123 are formed in a front face of the side plate part 121 at three equally spaced intervals. Each depression 123 has an arcuate outer circumferential surface 51 centered on the axial line CL0, an arcuate inner circumferential surface 52 facing the outer peripheral surface 51, and a pair of lateral end surfaces 53 and 54 connecting the outer circumferential surface 51 and the inner circumferential surface 52.

As shown in FIG. 2, the outer circumferential surface 51 is constituted by an inner circumferential surface 122a of the circular annular part 122. The depressions 123 are formed, for example, by swelling the side plate part 121 rearward using press-working. As shown in FIG. 4, border regions 124 where the depressions 123 are absent are provided between circumferentially adjacent pairs of the depressions 123, 123. As seen in FIG. 2, the border regions 124 have the sectional shape of the side plate part 121 before formation of the depressions 123.

As indicated in FIG. 4, the outer circumferential surface 51 and the inner circumferential surfaces 52 are formed in the shape of concavely curved surfaces. In each depression 123, a straight line CLa connecting a circumferential center point 51a of the outer circumferential surface 51 and a circumferential center point 52a of the inner circumferential surface 52 is defined as a center line of the depression 123. The center line CLa intersects the axial line CL0, and the depression 123 exhibits symmetry with respect to the center line CLa. The paired lateral end surfaces 53 and 54 have respective concave curved surface portions 531 and 541 connected to the inner circumferential surface 52 and respective connecting surfaces 532 and 542 connecting the curved surface portions 531, 541 and the outer circumferential surface 51. The curved surface portions 531 and 541 are formed in the shape of arcs having a predetermined radius of curvature R. The connecting surfaces 532 and 542 are configured as flat surfaces or curved surfaces (for example, composite surfaces) which intersect the outer circumferential surface 51 at a predetermined angle. In FIG. 4, the connecting surfaces 532 and 542 are configured as convexly curved surfaces. Points P10 and P20 in FIG. 4 are arc centers.

When lines TL1 and TL2 are drawn from the axial line CL0 tangentially to the curved surface portions 531 and 541 respectively, intersection points P12 and P22 between the curved surface portions 531 and 541 and the connecting surfaces 532 and 542 are located inside the pair of tangent lines TL1 and TL2. Therefore, parts of the border regions 124, i.e., portions radially outward of intersection points (tangent points P11 and P21) between the curved surface portions 531 and 541 and the tangent lines TL1 and TL2, project more circumferentially inward than the pair of tangent lines TL1 and TL2. Hereinafter, these are designated projections 124a and 124b.

The projection amount of the projections 124a and 124b from the tangent lines TL1 and TL2 can be defined as a function of angles α between line segments connecting the center points P10, P20 and tangent points P11, P21 and line segments connecting the center points P10, P20 and intersection points P12, P22. As explained further later, the projections 124a and 124b work to control radially outward movement of the seat members 4. In the present embodiment, the angles α are set greater than at least 0° in order to provide the projections 124a and 124b in the border regions 124.

Although not shown in a plan view in the drawings, the front plate 11, similarly to the rear plate 12, is formed at three locations with identically shaped depressions 113 (FIG. 2), and border regions 114 (FIG. 2) are formed between adjacent pairs of the depressions 113, 113. Specifically, in the rear face of the front plate 11, forwardly bulged depressions 113 are formed opposite the depressions 123 of the rear plate 12 and border regions 114 are formed opposite the border regions 124.

Similarly to the depressions 123 of the rear plate 12, each depression 113 is also delineated by the outer circumferential surface 51, the inner circumferential surface 52 and the paired inner circumferential surfaces 52 and 54, and has the same shape as the depression 123. The front plate 11 and rear plate 12 are joined with their circumferential phases adjusted to position the outer circumferential surface 51, inner circumferential surfaces 52 and lateral end surfaces 53, 54 of the rear plate 12 on axial extensions of the outer circumferential surface 51, inner circumferential surfaces 52 and lateral end surfaces 53, 54 of the front plate 11. Therefore, as shown in FIG. 2, housings 50 for accommodating the springs 3 and the seat members 4 are formed between bottom surfaces 55, the outer circumferential surface 51, inner circumferential surfaces 52 and lateral end surfaces 53, 54 of the depressions 113, and bottom surfaces 55, the outer circumferential surface 51, inner circumferential surface 52 and lateral end surfaces 53, 54 of the depressions 123. The housings 50 are local axial expansions of the space SP1.

As shown FIG. 2, the second rotor 2 has a ring-shaped inner plate 21 deployed in the space SP1 between the front plate 11 and rear plate 12 of the first rotor 1 to be rotatable around the axial line CL0. The inner plate 21 has an annular shaft 22 extending reward from its inner radial edge. A flange 11a is provided on an inner radial edge of the front plate 11 and a bearing 6 is interposed between this flange 11a and an outer circumferential surface of the shaft 22 to support the second rotor 2 rotatably relative to the first rotor 1 through the bearing 6. Although not illustrated, the second rotor 2 (for example, its annular shaft 22) is provided with a torque output portion for outputting torque to the transmission 102.

As shown in FIG. 3, the inner plate 21 has projections 23 which project radially outward from the shaft 22 at three locations equidistantly spaced circumferentially. The projections 23 have outer circumferential surfaces 24 of arcuate shape centered on the axial line CL0, and the outer circumferential surfaces 24 are located radially inward by a predetermined distance from the outer circumferential surfaces 51 of the housings 50 (depressions 113 and 123). Opposite lateral end surfaces 25 and 26 of the projections 23 connecting the outer circumferential surfaces 24 and the shaft 22 exhibit the same shape as opposite lateral surfaces of the border regions 114 and 124, i.e., as the lateral end surfaces 53 and 54 of the depressions 113 and 123. Therefore, the lateral end surfaces 25 and 26 have curved surface portions 251 and 261 of the same shape as the curved surface portions 531 and 541. Curved surface portions 252 and 262 of the same shape as the inner circumferential surfaces 52 of the housings 50 are provided between the curved surface portions 251 and 261 and the shaft 22.

FIG. 3 shows an initial state in which the first rotor 1 and second rotor 2 are in non-rotated condition and no torque acts on the first rotor 1 and second rotor 2. In the initial state, the circumferential positions of the projections 23 of the second rotor 2, i.e., the position of the lateral end surfaces 25 and 26, coincide with the circumferential position of the border regions 114 and 124 of the first rotor 1, i.e., the position of the lateral end surfaces 53 and 54.

As shown in FIG. 3, multiple springs 3 (two springs in FIG. 3) are tandemly installed in the respective housings 50 between the front plate 11 and rear plate 12 of the first rotor 1. The springs 3 are, for example, coil springs which extend along cylindrical surfaces and whose opposite longitudinally ends are held by the seat members (spring seats) 4. The seat members 4 include first seat members 41 and second seat members 42 deployed at opposite circumferential ends of the housings 50 and intermediate seat members 43 deployed between the first seat members 41 and second seat members 42. The seat members 4 are, for example, constituted of resin material of lower specific weight than metal.

Rotation direction of the first rotor 1 rotationally driven by the engine 101 is indicated by arrow R1 in FIG. 3. The first seat members 41 are positioned in the housings 50 rearmost in the direction of rotation R1 and the second seat members 42 are positioned frontmost in the direction of rotation R1. As shown in FIG. 2, opposite forward-rearward ends of the seat members 4 are disposed in the depressions 113 and 123.

As shown in FIG. 3, holding portions 411 and 421 for holding the springs 3 are formed on one end surfaces of the first seat members 41 and the second seat members 42, and contact surfaces 412 and 422 which contact the curved surface portions 531 and 541 of the housings 50 (depressions 113 and 123) at forward-rearward ends are formed on other end surfaces thereof. At their forward-rearward middle portions, the contact surfaces 412 and 422 are contactable also with the curved surface portions 251 and 261 of the projections 23 of the second rotor 2. Holding portions 431 for holding the springs 3 are formed on opposite circumferential end surfaces of the intermediate seat members 43. The holding portions 411, 421 and 431 are, for example, constituted as circular grooves complementary to the outer shape of the springs 3.

The contact surfaces 412 of the first seat members 41 and the contact surfaces 422 of the second seat members 42 are arcuately formed. The radius of curvature of the contact surfaces 412 is the same as that of the curved surface portions 531 of the first rotor 1 and the curved surface portions 251 of the second rotor 2, and the radius of curvature of the contact surfaces 422 is the same as that of the curved surface portions 541 of the first rotor 1 and the curved surface portions 261 of the second rotor 2. Therefore, the first seat members 41 can roll (or slide) along the curved surface portions 531 and 251, and second seat members 42 can roll (or slide) along the curved surface portions 541 and 261. The intermediate seat members 43 are accommodated in the housings 50 to be movable circumferentially and radially.

Figure 5:
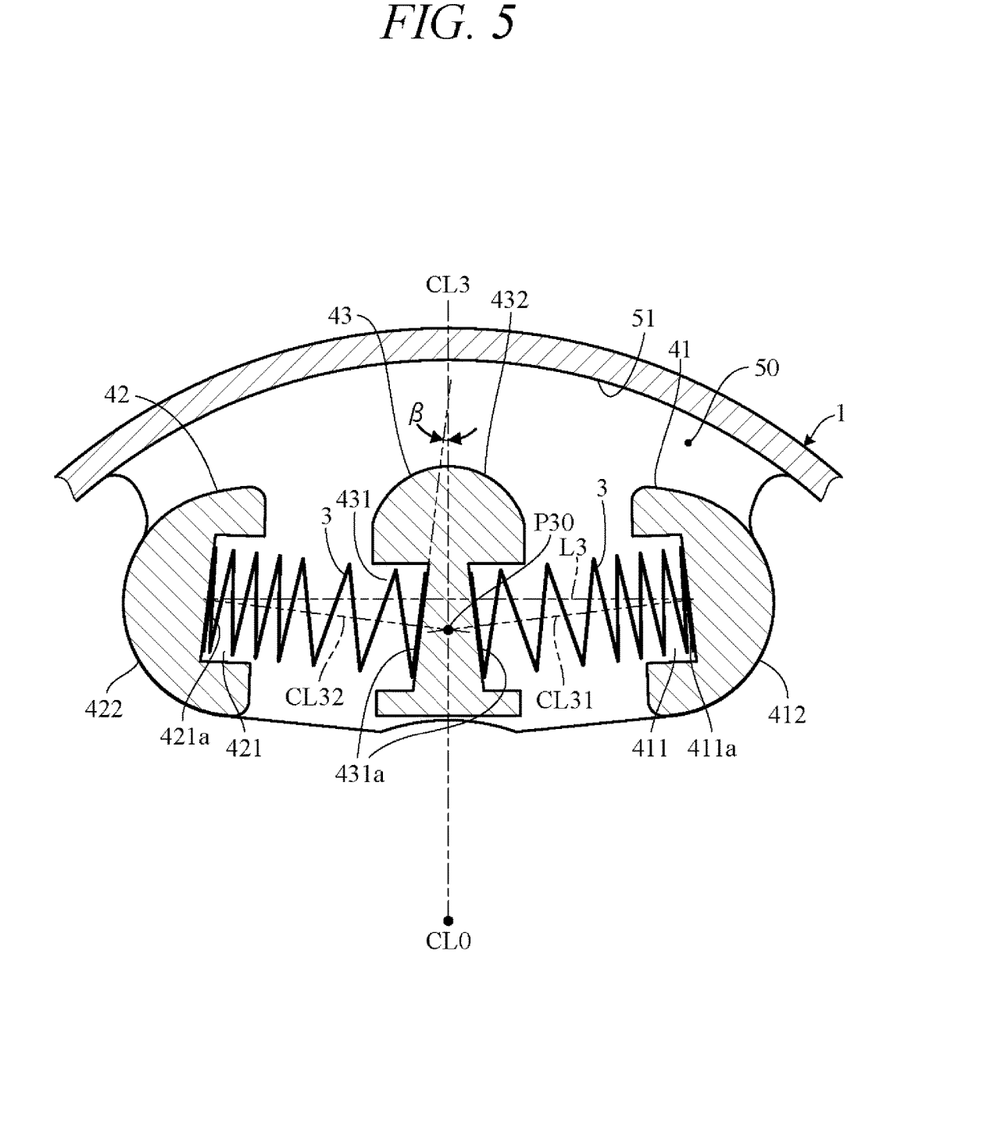
FIG. 5 is an enlarged view of a main part configuration of FIG. 3.

FIG. 5 is an enlarged view of a main part of FIG. 3. As shown in FIG. 5, the first seat member 41 and the second seat member 42 are symmetrically shaped with respect to a center line CL3 bisecting the intermediate seat member 43 and passing through the axial line CL0, and are positioned symmetrically relative to the center line CL3. The intermediate seat member 43 is symmetrically shaped with respect to the center line CL3. Seats 411a, 421a and 431a of the springs 3 are formed on bottom surfaces of the holding portions 411, 421 and 431 of the seat members 4.

Each seat 431a of the intermediate seat member 43 is formed to incline with respect to the center line CL3 so that the center line CL3 and an extension of the seat 431a intersect on an outer circumferential surface 432 side of the intermediate seat member 43 at a predetermined angle β (>0). The angle is called "seat angle." In the initial state in which the first rotor 1 and second rotor 2 are in non-rotated condition and no centrifugal force acts on the intermediate seat members 43, elastic force of the springs 3 keeps the intermediate seat member 43 in an initial orientation in which the seats 411a, 421a and the seat 431a lie parallel.

In the initial state, an intersection point P30 of center lines CL31 and CL32 of the coil-shaped pair of springs 3 is located more radially inward than a reference line L3 connecting a center of the seat 411a of the first seat member 41 and a center of the seat 421a of the second seat member 42 by a straight line. Therefore, the intermediate seat member 43 side of each spring of the pair of springs 3 is inclined with respect to the reference line L3 so as to slope radially inward. In other words, the center lines CL31 and CL32 of the springs 3 do not lie on the same straight line, but cross at a predetermined angle smaller than 180°.

The initial orientation of each intermediate seat member 43 is determined as a function of the seat angle β of the intermediate seat member 43. Specifically, in proportion as the seat angle β is larger, the inclination angle of the springs 3 with respect to the reference line L3 increases and the initial position of the intermediate seat member 43 shifts radially inward. In the present embodiment, the initial position of the intermediate seat member 43 is established so that the intersection point P30 of the center lines CL31 and CL32 is located on the reference line L3 when, for example, the intermediate seat member 43 moves radially outward due to centrifugal force during idle rotation of the engine 101, and the seat angle β is established in line with this initial position. In other words, the seat angle β is established so that during idle rotation the center lines CL31 and CL32 of the springs 3 lie on the same straight line (reference line L3).

The members of each pair of springs 3 are formed so that mass per unit length, i.e., density, of each spring decreases from the associated first or second seat members 41, 42 toward the intermediate seat members 43. In other words, the springs 3 are made with irregular pitch along the center lines CL31 and CL32. The convex outer circumferential surface 432 of the intermediate seat member 43 is formed arcuately to have smaller radius of curvature than the outer circumferential surface 51 of the housing 50.

Operation of the torque transmission apparatus 100 configured as set forth in the foregoing will be explained. As shown in FIG. 4, angle θ formed between a first center line CL1 extending radially from the axial line CL0 and passing through a circumferential middle of the border regions 114 and 124 of the first rotor 1 and a second center line CL2 extending radially from the axial line CL0 and passing through a circumferential middle of the projections 23 of second rotor 2 (dotted line) (called torsion angle θ) represents amount of rotation of the second rotor 2 with respect to the first rotor 1. In the initial state (FIG. 3), the first center line CL1 and the second center line CL2 coincide. Torsion angle θ is therefore 0°.

When the first rotor 1 has rotated in a predetermined direction (direction of arrow R1) to make amount of rotation of the first rotor 1 greater than amount of rotation of the second rotor 2, torsion angle θ is positive. Conversely, when amount of rotation of the first rotor 1 is smaller than amount of rotation of the second rotor 2 in R1 direction, torsion angle θ is negative.

Figure 6:
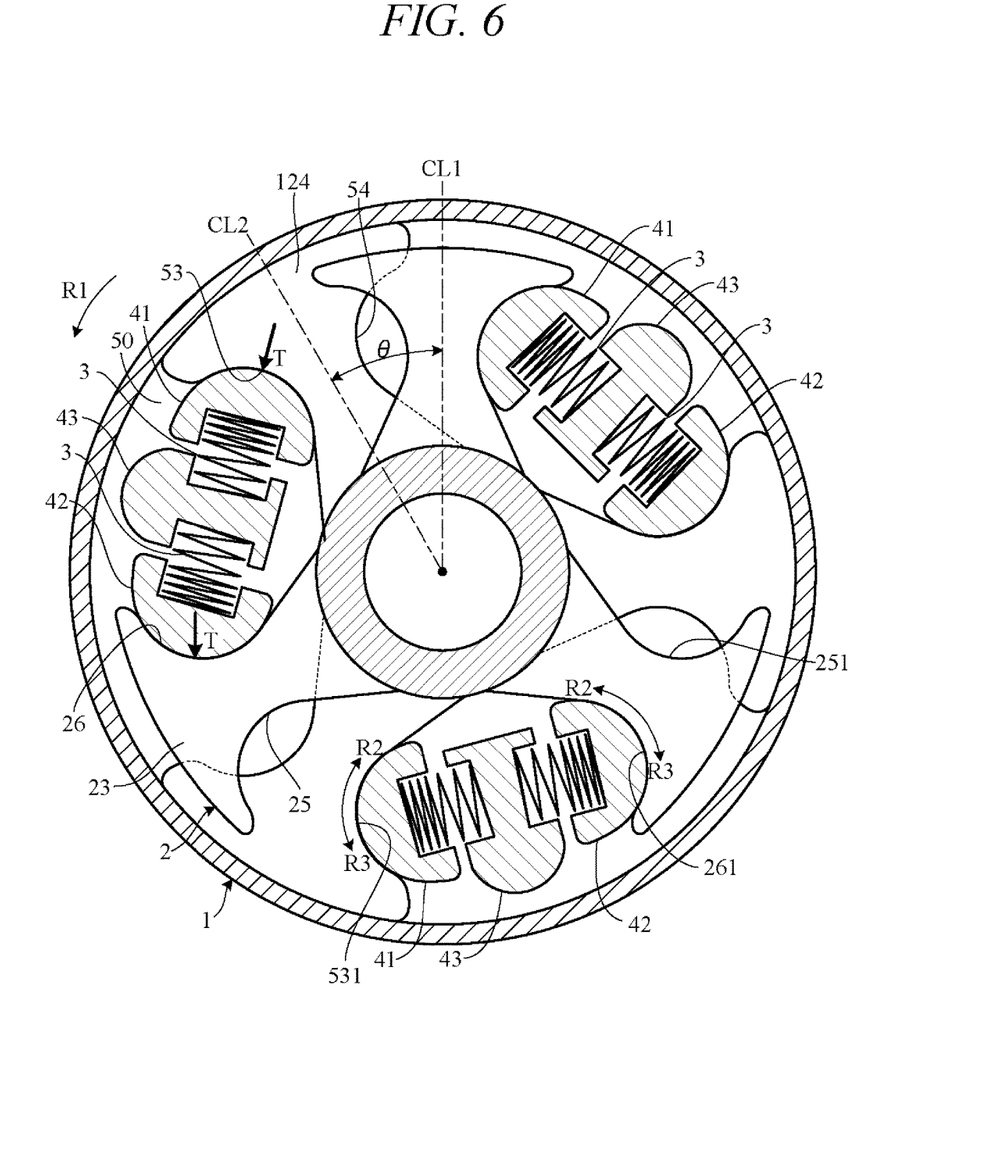
FIG. 6 is a diagram for explaining an operation of the torque transmission apparatus according to the embodiment of the present invention.

During ordinary driving for example, as shown in FIG. 6, torque T of the first rotor 1 passes from the lateral end surfaces 53 of the housings 50 (border regions 114, 124) through the first seat members 41, springs 3, intermediate seat members 43, springs 3 and second seat members 42 and acts on the lateral end surfaces 26 of the projections 23 of the second rotor 2. In this case, the torsion angle θ is positive and the second rotor 2 can be rotated in the direction of arrow R1 by torque of the first rotor 1.

In contrast, although not illustrated, during engine braking or the like activated by a shift-down, for example, amount of rotation the second rotor 2 becomes greater than that of the first rotor 1, so that torque of the second rotor 2 passes from the lateral end surfaces 25 of the projections 23 through the second seat members 42, springs 3, intermediate seat members 43, springs 3 and first seat members 41 and acts on the lateral end surfaces 54 of the housings 50 of the first rotor 1. In this case, the torsion angle θ is negative and the first rotor 1 is rotated in the direction of arrow R1 by torque of the second rotor 2.

Irrespective of whether the torsion angle θ is positive or negative, any torque fluctuation arising between the first rotor 1 and second rotor 2 can be absorbed by expansion and contraction of the springs 3. As a result, transmission to the transmission 102 of vibration due to rotational fluctuation of the engine 101 (combustion oscillation or the like) can be mitigated.

Behavior of the springs 3 and the seat members 4 constituting characteristic operation of the torque transmission apparatus 100 according to the present embodiment will now be explained in detail. In the initial state when the first rotor 1 and second rotor 2 are in non-rotated condition, no centrifugal force acts on the seat members 4. Therefore, as shown in FIG. 5, the intersection point P30 of the center lines CL31, CL32 of each pair of springs 3 is located radially inward of the associated reference line L3. In other words, the intermediate seat members 43 are located radially inward of the associated first and second seat members 41, 42.

When, for example, the engine 101 rotates at idle speed starting from this state, the first rotor 1 rotates in the direction of arrow R1 in FIG. 3 in response to this engine rotational speed. In addition, torque of the first rotor 1 is transmitted to the second rotor 2 through the seat members 4 and the springs 3, whereby the second rotor 2 also rotates in the direction of arrow R1. Centrifugal force therefore acts on the seat members 4 in proportion to the rotational speed of the first and second rotors 1, 2.

At this time, although the intermediate seat members 43 move radially outward from their initial positions, radial movement of the first and second seat members 41, 42 is restricted by the border regions 114, 124 of the first rotor 1 and the projections 23 of the second rotor 2. In this state, elastic force of the springs 3 acts on the first and second seat members 41, 42 in proportion to radial movement of the intermediate seat members 43. Owing to this elastic force, the first and second seat members 41, 42 roll (or slide) along the lateral end surfaces 53 and 54 (curved surface portions 531 and 541) of the border regions 114, 124 and the lateral end surfaces 25, 26 (curved surface portions 251, 261) of the projections 23 in the direction of arrows R2 in FIG. 3.

Owing to the rolling of the first and second seat members 41, 42 accompanying radial movement of the intermediate seat members 43 in this manner, inclination of the center lines CL31 and CL32 of each pair of springs 3 with respect to the associated reference line L3 changes. Therefore, the springs 3 of each pair are not bent but extend linearly. As a result, each pair of springs 3 can constantly produce suitable elastic force irrespective of the radial location of the associated intermediate seat member 43, thus enabling the torque transmission apparatus 100 to achieve good vibration absorption performance.

When the engine 101 is idling, the intersection point P30 of the center lines CL31 and CL32 of each pair of springs 3 moves to the associated reference line L3, so that the center lines CL31 and CL32 come to lie on the reference line L3. During idle rotation, torque from the engine is low, so that the torsion angle θ of the second rotor 2 with respect to the first rotor 1 is small.

When torque acting on the second rotor 2 from the first rotor 1 rises from this condition owing to increase in engine speed caused by, for example, depression of an accelerator pedal, torsion angle θ widens as shown in FIG. 6. Moreover, centrifugal force on the intermediate seat members 43 increases, so that the intermediate seat members 43, specifically the intersection points P30 of the center lines CL31 and CL32 of the springs 3, move radially outward of the reference lines L3.

When the engine speed increases, along with radially outward movement of the intermediate seat members 43, the first seat members 41 roll along the curved surface portions 531 of the first rotor 1 and the second seat members 42 roll along the curved surface portions 261 of the second rotor 2, in the directions of arrows R2 in FIG. 6. On the other hand, when centrifugal force declines owing to decreasing engine speed, along with radially inward movement of the intermediate seat members 43, the first seat members 41 roll along the curved surface portions 531 of the first rotor 1 and the second seat members 42 roll along the curved surface portions 261 of the second rotor 2, in the directions of arrows R3 in FIG. 6. As a result, the springs 3 of each pair are kept straight irrespective of radial movement of the intermediate seat members 43, whereby they can constantly produce suitable elastic force.

In the present embodiment, the angle 3 of the intermediate seat members 43 is set so that intersection points P30 of the center lines CL31, CL32 of the pairs of springs 3 are located radially inward of the reference lines L3 in the initial state of the engine stop and the intersection points P30 are located on the reference line L3 during idle rotation of the engine 101 (FIG. 5). By initially positioning the intermediate seat members 43 radially inward of the first and second seat members 41, 42 in this manner, distance between the outer circumferential surfaces 432 of the intermediate seat members and the outer circumferential surfaces 51 of the housings 50 can be enlarged.

Moreover, in the present embodiment, the springs 3 have irregular pitch by which density of the springs 3 on the side of the intermediate seat members 43 is smaller than that on the sides of the first and second seat members 41, 42. Since mass near the middle of each pair of springs 3 (on the side of the associated intermediate seat member 43) is therefore relatively small, centrifugal force proportional to the weight of the springs 3 can be reduced. As a result, radially outward movement of the intermediate seat members 43 can be suppressed.

Therefore, it is possible in each housing 50 to prevent contact between the outer circumferential surface 432 of the intermediate seat member 43 and the outer circumferential surface 51 of the housing 50 when the intermediate seat member 43 moves radially outward due to centrifugal force. As a result, sticking of the intermediate seat member 43 to the outer circumferential surface 51 can be prevented, and smooth expansion and contraction of the springs 3 is ensured.

The arcuate outer circumferential surface 432 of each intermediate seat member 43 has smaller radius of curvature than the outer circumferential surface 51 of the housing 50. Therefore, even if the outer circumferential surface 432 should come in contact with the outer circumferential surface 51, the area of contact would be small. This further ensures that the intermediate seat members 43 can slide smoothly without sticking to the outer circumferential surfaces 51.

According to the present embodiment, the following operations and effects can be achieved.

(1) The torque transmission apparatus 100 includes a first rotor 1 rotatable around an axial line CL0, a second rotor 2 both installed to be rotatable around a common axial line CL0, springs 3 deployed in a torque transmission path TP between the first rotor 1 and the second rotor 2 to transmit torque from one of the first rotor 1 and second rotor 2 to the other of the first rotor 1 and second rotor 2 and absorb torque fluctuation between the first rotor 1 and the second rotor 2, and seat members 4 (41 to 43) having holding portions 411, 421, 431 for holding ends of the springs 3 (FIG. 3). The first rotor 1 includes housings 50 which circumferentially movably accommodate the seat members 4, and the housings 50 include outer circumferential surfaces 51 and lateral end surfaces 53, 54 formed into concave curved surfaces so as to restrict the seat members 4 from moving radially and circumferentially (FIG. 4). The second rotor 2 includes radially projecting projections 23, and the projections 23 include lateral end surfaces 25, 26 formed into concave curved surfaces so as to restrict the seat members 4 from moving radially and circumferentially (FIG. 3). The seat members 4 include pairs of seat members 41, 42 whose paired members are deployed at opposite circumferential ends of the housings 50, and the paired seat members 41, 42 are interposed between the springs 3 and both the lateral end surfaces 53, 54 of the housings 50 and the lateral end surfaces 25, 26 of the projections 23 in the torque transmission TP so as to be contactable with and separable from the lateral end surfaces 53, 54 of the housings 50 and the lateral end surfaces 25, 26 of the projections 23 (FIG. 3). The pairs of first and second seat members 41, 42 respectively include the holding portions 411, 421 at one circumferential end surfaces thereof and contact surfaces 412, 422 at the other circumferential end surfaces, and the contact surfaces 412, 422 are formed into convex curved surfaces so as to rollably contact the lateral end surfaces 53, 54 of the housings 50 and the lateral end surfaces 25, 26 of the projections 23 (FIG. 3).

This configuration ensures that while the pairs of seat members 41, 42 roll along the lateral end surfaces 53, 54 of the housings 50 and the lateral end surfaces 25, 26 of the projections 23, their circumferential and radial positions are concomitantly restrained by these lateral end surfaces 53, 54 and lateral end surfaces 25 and 26. Therefore, the pairs of seat members 41, 42 can be prevented from sticking to the outer circumferential surface 51 of the housings 50. Moreover, the rolling of the seat members 41, 42 enables the springs 3 to stay straight without bending during attitude (inclination) change, so that the springs 3 can produce suitable elastic force for enabling the torque transmission apparatus 100 to exhibit good vibration absorption performance.

(2) The seat members 4 include intermediate seat members 43 interposed one between the seat members (first and second seat members 41, 42) of each pair, and springs 3 are interposed between each of the first and second seat members 41, 42 and the associated intermediate seat member 43 (FIG. 3). This results in multiple springs 3 being tandemly deployed in the housings 50 interrupted by the interposed intermediate seat members 43. Therefore, it becomes possible to utilize short, straight springs 3 in the torque transmission apparatus 100. In this configuration, although the intermediate seat members 43 move radially under centrifugal force, their movement is accompanied by rolling of the first and second seat members 41, 42, so that the springs 3 always expand and contract linearly irrespective of the radial position of the associated intermediate seat member 43. This enables the torque transmission apparatus 100 to achieve reliable vibration absorption performance by continuously maintaining optimum spring force.

(3) The paired springs 3 are deployed at inclinations so at to position the intersection points P30 of the center lines CL31, CL32 of the paired springs 3 radially inward of reference lines L3 connecting centers of holding portions 411, 421 of the first and second seat members 41, 42 with each other (FIG. 5). In the initial state, therefore, each intermediate seat member 43 is located radially inward of the associated first and second seat members 41, 42, thereby expanding distance between the outer circumferential surface 51 of the associated housing 50 and an outer circumferential surface 432 of the intermediate seat member 43. As a result, contact between the outer circumferential surface 51 of the housing 50 and the outer circumferential surface 432 of the intermediate seat member 43 can be avoided.

(4) Density per unit length of each spring of the paired springs 3 decreases from a side of the first or second seat member 41, 42 toward a side of the associated intermediate seat member 43 (FIG. 5). Mass of the springs 3 therefore grows lighter from the first and second seat members 41, 42 toward the intermediate seat members 43. As a result, centrifugal force proportional to the weight of the springs 3 can be reduced on the side of the intermediate seat members 43, thereby suppressing radially outward movement of the intermediate seat members 43.

(5) The outer circumferential surfaces 432 of the intermediate seat members 43 have smaller radius of curvature than the outer circumferential surfaces 51 of the housings 50. Therefore, even if centrifugal force should cause the intermediate seat members 43 to contact the outer circumferential surfaces 51 of the housings 50, sticking of the intermediate seat members 43 can be prevented because the area of contact between the intermediate seat members 43 and the outer circumferential surfaces 51 is small. Moreover, smooth sliding of the intermediate seat members 43 along the outer circumferential surfaces 51 is ensured because contact is between convex curved surfaces (outer circumferential surfaces 432) of the intermediate seat members 43 and concave surfaces (outer circumferential surfaces 51).

Modifications

Various modifications of the embodiment described above are possible. Some of these are explained in the following. Although in the above embodiment the seat angle of the intermediate seat members 43 is set larger than 0° so that in the initial state the intersection points P30 of the center lines CL31, CL32 of the paired springs 3 are located radially inside the reference lines L3, the value of the seat angle is not limited to this. For example, the seat angle β can be set at 0°. In such case, the intersection points P30 lie on the reference lines L3 in the initial state. Although in the above embodiment the springs 3 are given irregular pitch, they can have regular pitch instead. In other words, springs 3 which have constant density over their full length are also usable.

Although in the above embodiment the first rotor 1 is provided with the housings 50 at three circumferentially spaced locations and the second rotor 2 is provided with the projections 23 at three circumferentially spaced locations, the number of housings 50 and projections 23 is not limited to this. For example, they can each be provided at two circumferential locations or at four or more circumferential locations. Although in the above embodiment paired springs 3 are tandemly deployed on both sides of a single intermediate seat member 43, it is alternatively possible to tandemly deploy three or more springs 3 interrupted by multiple intermediate seat members 43. Although in the above embodiment the outer circumferential surfaces 432 of the intermediate seat members 43 are arcuately formed, the outer circumferential surfaces 432 are not limited to this the shape.

Although in the above embodiment the lateral end surfaces 53 and 54 of the housings 50 and the lateral end surfaces 25, 26 of the projections 23 are formed with the arcuately curved surface portions 531, 541, 251, 261, respectively, and the end surfaces of the first seat members 41 and second seat members 42 are formed with the arcuate contact surfaces 412, 422 of the same shape as the curved surface portions 531, 541, 251, 261, the curved surface portions 531, 541, 251, 261 and the contact surfaces 412, 422 are not limited to this configuration. Specifically, the radius of curvature of the contact surfaces 412, 422 need not be the same as the radius of curvature of the curved surface portions 531, 541, 251, 261 insofar as the curved surface portions 531, 541, 251, 261 are respectively constituted as concavely curved surfaces, the contact surfaces 412, 422 are constituted as convexly curved surfaces, and the seat members 41, 42 rollably contact the curved surface portions 531, 541, 251, 261.

In the above embodiment, although the first rotor 1 is connected to the engine 101 and the second rotor 2 is connected to the transmission 102, a reverse arrangement having the first rotor 1 connected to the transmission 102 and the second rotor 2 to the engine 101 is also feasible. In the above embodiment, although the springs 3 (coil springs) are interposed between the first rotor 1 and the second rotor 2 and torque is transmitted through the springs 3, the elastic body configuration can be of any type insofar as it is deployed in the torque transmission path TP between the first rotor 1 and the second rotor 2 and while transmitting torque from one to the other of the first rotor 1 and the second rotor 2 also absorbs torque fluctuation between the first rotor 1 and the second rotor 2.

In the above embodiment, the torque transmission path TP between the first rotor 1 and the second rotor 2 is configured by the seat members 4 and the springs 3. Specifically, a configuration is adopted wherein when torque from the first rotor 1 acts on the second rotor 2, torque from the contact surfaces (torque transmission portions) 422 of the second seat members 42 acts on the curved surface portions 261 (torque receiving portions) of the projections 23 of the second rotor 2, and when torque from the second rotor 2 acts on the first rotor 1, torque from the curved surface portions 251 (torque transmission portions) of the projections 23 acts on the contact surfaces (torque receiving portions) 412 of the first seat members 41. However, the torque transmission path TP is not limited to this configuration.

Although in the above embodiment the depressions 113 and 123 are provided in the front plate 11 and the rear plate 12, respectively, of the first rotor 1 and the housings 50 are configured by the depressions 113 and 123, the housings 50 can be of any configuration insofar as the outer circumferential surfaces 51 and the lateral end surfaces 53 and 54 restricting radial and circumferential movements of the seat members 4 are present. For example, the housings 50 can be configured solely by the front plate 11. Although in the above embodiment projections are projected radially outward from an annular shaft portion 22, projecting portions are projected radially inward from inner circumferential surface of a ring-shaped plate, for example, and the configuration of the second rotor is not limited to aforesaid configuration.

Although the holding portions 411, 421 and 431 of the springs 3 which are one example of elastic bodies are provided in the seat members 4 in the above embodiment, the shape of the seat members 4 can be modified variously in accordance with the shape of the elastic bodies. Therefore, the configuration of the seat member 4 is not limited to that stated above. More specifically, the paired seat members 41 and 42 can be of any configuration insofar as paired seat members are provided so as to be contactable with and separable from the first and second rotors 1 and 2 between the springs 3 and the first and second rotors 1, 2 and include holding portions at one end surfaces and contact surfaces at the other end surfaces.

Although in the above embodiment the engine 101 mounted on a vehicle is used as the power source, the power source is not limited to a vehicle engine. Further, the driven unit which is driven by the torque generated by the power source can be one other than the transmission 102. In other words, the torque transmission apparatus of the present invention can be applied to various torque transmission paths for transmitting torque generated by a power source to a driven unit. The torque transmission apparatus of the present invention can be applied to other than vehicles.

The above embodiment can be combined as desired with one or more of the aforesaid modifications. The modifications can also be combined with one another.

According to the present invention, since the pairs of seat members deployed in the housing include the convexly curved contact surfaces which rollably contact the lateral end surfaces of the housing and the lateral end surfaces of the projecting portions, it is possible to prevent sticking of the seat members owing to centrifugal force and to produce suitable elastic force of the spring by the rolling of the seat members, whereby good vibration absorption performance can be achieved.

Above, while the present invention has been described with reference to the preferred embodiments thereof, it will be understood, by those skilled in the art, that various changes and modifications may be made thereto without departing from the scope of the appended claims.

What is claimed is:

1. A torque transmission apparatus, comprising:
a first rotor rotatable around an axial line;
a second rotor rotatable around the axial line relative to the first rotor, facing the first rotor;
an elastic body provided in a torque transmission path between the first rotor and the second rotor to transmit torque from one of the first rotor and the second rotor to the other of the first rotor and the second rotor and to absorb torque fluctuation between the first rotor and the second rotor; and
seat members including holding portions configured to hold ends of the elastic body; wherein
the first rotor includes a housing configured to accommodate the seat members in a circumferentially movable manner, the housing including an outer circumferential surface and lateral end surfaces, the lateral end surfaces being formed into concave curved surfaces so as to restrict the seat members from moving radially and circumferentially,
the second rotor includes projecting portions formed so as to radially project, each of the projecting portions including lateral end surfaces, the lateral end surfaces being formed into concave curved surfaces so as to restrict the seat members from moving radially and circumferentially,
the seat members include a pair of seat members deployed at opposite circumferential ends of the housing, each of the pair of seat members being interposed between the elastic body and both a lateral end surface of the lateral end surfaces of the housing and a lateral end surface of the lateral end surfaces of the projecting portion in the torque transmission path so as to be contactable with and separable from the lateral end surface of the housing and the lateral end surface of the projecting portion,
the seat members further include an intermediate seat member deployed between the pair of seat members in the housing,
each of the pair of seat members includes the holding portion at one circumferential end surface thereof and a contact surface at the other circumferential end surface thereof, the contact surface being formed into a convex curved surface so as to rollably contact the lateral end surface of the housing and the lateral end surface of the projecting portion;
the elastic body includes a pair of springs interposed between the pair of seat members and the intermediate seat member, and
the pair of springs are deployed at inclinations so that an intersection point of center lines of the pair of springs is radially inward of a reference line connecting centers of the holding portions of the pair of seat members with each other in an initial state where no centrifugal force acts on the intermediate seat member.

2. The apparatus according to claim 1, wherein a density per unit length of the pair of springs decreases from a side of the pair of seat members toward a side of the intermediate seat member.

3. The apparatus according to claim 1, wherein an outer peripheral surface of the intermediate seat member has a smaller radius of curvature than the outer circumferential surface of the housing.

4. The apparatus according to claim 1, wherein the second rotor includes the projecting portions at three circumferentially spaced locations, and the pair of seat members and the intermediate seat member are arranged between the projecting portions adjacent to each other circumferentially.

5. The apparatus according to claim 1, wherein curvatures of the contact surfaces of the seat members, curvatures of the lateral end surfaces of the housing and curvatures of the lateral end surfaces of the projecting portions are equivalent to one another.

6. The apparatus according to claim 1, wherein the first rotor includes a pair of plates connected with each other and arranged parallel to each other along the axial line, and
the housing is constructed of a pair of depressions provided in surfaces facing each other of the pair of plates.

7. The apparatus according to claim 6, wherein the second rotor includes an inner plate accommodated between the pair of plates in a manner rotatable relative to the pair of plates, and the projecting portions are projected from a periphery of the inner plate.

8. The apparatus according to claim 1, wherein the first rotor is connected to an output shaft of an engine mounted on a vehicle, and the second rotor is connected to an input shaft of a transmission mounted on the vehicle.

* * * * *